(12) United States Patent
Gollamudi

(10) Patent No.: US 8,675,772 B2
(45) Date of Patent: Mar. 18, 2014

(54) METHOD FOR MULTIPLE ANTENNA TRANSMISSION USING PARTIAL CHANNEL KNOWLEDGE

(75) Inventor: Sridhar Gollamudi, Pine Brook, NJ (US)

(73) Assignee: Alcatel Lucent, Paris (FR)

(*) Notice: Subject to any disclaimer, the term of this patent is extended or adjusted under 35 U.S.C. 154(b) by 1087 days.

(21) Appl. No.: 09/851,858

(22) Filed: May 9, 2001

(65) Prior Publication Data

US 2003/0035490 A1   Feb. 20, 2003

(51) Int. Cl.
 *H04B 7/26* (2006.01)
 *H04L 23/00* (2006.01)

(52) U.S. Cl.
 USPC ............................ 375/299; 375/377; 455/101

(58) Field of Classification Search
 USPC ......... 375/567, 295, 296, 259, 267, 299, 377, 375/146, 147; 455/91, 101
 See application file for complete search history.

(56) References Cited

U.S. PATENT DOCUMENTS

| | | | | |
|---|---|---|---|---|
| 4,780,884 | A * | 10/1988 | Karabinis | 375/261 |
| 6,121,927 | A * | 9/2000 | Kalliojarvi | 342/453 |
| 6,154,485 | A | 11/2000 | Harrison | 375/130 |
| 6,178,196 | B1 * | 1/2001 | Naguib et al. | 375/148 |
| 6,185,258 | B1 | 2/2001 | Alamouti et al. | |
| 6,317,410 | B1 * | 11/2001 | Allpress et al. | 370/203 |
| 6,587,515 | B1 * | 7/2003 | Jafarkhani et al. | 375/299 |
| 6,594,473 | B1 * | 7/2003 | Dabak et al. | 455/101 |
| 6,661,856 | B1 * | 12/2003 | Calderbank et al. | 375/347 |
| 6,754,286 | B2 * | 6/2004 | Hottinen et al. | 375/299 |
| 2001/0033622 | A1 * | 10/2001 | Jongren et al. | 375/267 |
| 2002/0172260 | A1 * | 11/2002 | Rice | 375/130 |

OTHER PUBLICATIONS

"Space-time processing for wireless communications," by A. Paulraj and C. Papadias, IEEE Signal Processing Magazine, vol. 14, pp. 49-83, Nov. 1997.
"A comparison of base station transmit diversity methods for third generation cellular standards," by K. Rohani, M. Harrison and K. Kuchi, in Vehicular Technology Conference, 1999 IEEE 49th, vol. 1, 1999, pp. 351-355.
"Diversity for the direct-sequence spread spectrum system using multiple transmit antennas," by V. Weerackody, AT&T Technical Memo, 1993.
"Combining transmit beamforming and orthogonal space-time block codes by utilizing side information," by G. Jongren et al., IEEE Sensor Array and Multichannel Signal Processing Workshop, 2000, pp. 153-157.
"A simple transmitter diversity scheme for wireless communications," by S. Alamouti, IEEE Journal on Selected Areas in Communcatons, pp. 1451-1458, Oct. 1998.
"Performance analysis of CDMA transmit diversity methods," by L. M. A. Jalloul, K. Rohani, K. Kuchi and J. Chen, Vehicular Technology Conference, 1999, VTC 1999, Fall, IEEE VTS 50th, vol. 3, pp. 1326-1330.

* cited by examiner

*Primary Examiner* — Tesfaldet Bocure
(74) *Attorney, Agent, or Firm* — Davidson Sheehan LLP

(57) ABSTRACT

This invention relates to a closed loop duplex communications system having at least two antennae at the forward link transmitter. A feedback channel from the forward link receiver to the forward link transmitter carries feedback information about the phase and magnitude relationships of the forward link channels from different transmitter antennae. The feedback information is used to compute beamforming weights for the forward link. The signals received on the at least two antennae of the reverse link are used to compute code correlation parameters for application on the forward link.

21 Claims, 2 Drawing Sheets

METHOD FOR MULTIPLE ANTENNA TRANSMISSION USING PARTIAL CHANNEL KNOWLEDGE

BACKGROUND OF THE INVENTION

1. Field of the Invention

This invention relates to wireless communication systems and more particularly to a method for effective wireless communication in the presence of fading and/or other degradations.

2. Description of the Related Art

The capacity and data rate of existing code division multiple access (CDMA) systems can be increased by using multiple antennas at the transmitter. The need to provide increased data rates to a large number of users is an especially urgent problem in both the downlink (base-to-mobile) and the uplink (mobile-to-base) in third generation (3G) wideband CDMA systems. Antenna arrays have been often proposed as a means to improve performance in both links of CDMA systems. In the uplink, an antenna array can be employed at the base station (BS) to provide array gain, interference reduction, and diversity gain. (See "Space-time processing for wireless communications," by A. Paulraj and C. Papadias, IEEE Signal Processing Magazine, Vol. 14, pp. 49-83, November 1997.) This can, in turn, provide improved range, quality, and capacity in the reverse link of the system.

Since BSs can accommodate the electronics, power consumption, and size of antenna arrays, receive diversity techniques are easily implemented. However, similar improvements on the downlink seem to be harder to obtain. The physical demands of antenna-array processing units make the use of multiple antennas at the mobile handset problematic. The small size of handheld units limits both the spatial resolution of the array (because of the small number of elements), as well as the diversity gain (because the elements are close to one another). It therefore seems more feasible to perform forward-link spatial processing at the BS transmitter.

One possible approach for antenna-array transmit processing is by beamforming which provides array gain at the subscriber unit. In these schemes, the transmitter typically operates in "closed-loop," i.e., it uses channel information that is fed to it by the receiver through the reverse link in order to shape beams in the forward link (base-to-mobile). The success of transmit beamforming depends on the quality of the channel estimates, the feedback channel, the mapping between the two links, and the dynamics of the signal and interference. Closed-loop techniques typically suffer from reduced reverse link capacity because of the extra channel information that is transmitted.

Another approach employs transmit diversity or orthogonal space-time coding (STC) at the base station with the goal of providing diversity gain to the mobile subscriber. Transmit diversity can be simpler to implement because it can operate in an open-loop, that is, without channel knowledge at the transmitter. This mode of operation is particularly appealing when the mobile speed is high enough to make channel estimation and tracking too difficult. Moreover, open-loop techniques do not penalize the reverse link capacity as closed-loop techniques do. These arguments suggest that multiple-antenna open-loop transmit diversity is a practical way to improve the performance of current systems.

Some open-loop transmit diversity techniques for the CDMA forward link are disclosed in "A comparison of base station transmit diversity methods for third generation cellular standards," by K. Rohani, M. Harrison and K. Kuchi, in Vehicular Technology Conference, 1999 IEEE 49$^{th}$, Volume 1, 1999, pages 351-355; "Performance analysis of CDMA transmit diversity methods," by L. M. A. Jalloul, K. Rohani, K. Kuchi and J. Chen, Vehicular Technology Conference, 1999, VTC 1999, Fall, IEEE VTS 50$^{th}$, Volume 3, pages 1326-1330; and in "Diversity for the direct-sequence spread spectrum system using multiple transmit antennas," by V. Weerackody, AT&T Tech. Memo., 1993. In Rohani et al, the spatial diversity inherent in the channel is not fully exploited. This drawback can be compensated when the mobile travels quickly since the receiver gains diversity through temporal fluctuations in the channel (exploited through coding and interleaving). However, when the mobile is stuck in a deep fade on a slow-fading channel, any temporal diversity advantage is lost. Since many 3G wireless data users may be either static or moving at low (pedestrian) speeds, dependence on methods that require temporal diversity, wherever possible, should be reduced. In Weerackody, full spatial diversity is achieved with two transmitter antennas, at the cost, however, of doubling the resources used (either a 100% increase in bandwidth or number of required spreading codes per user). These extra resources limit the overall efficiency of the system.

With closed-loop beamforming, the channel characteristics are measured and the gain and phase of the signals applied to each element in an antenna array are modified to create an antenna pattern that maximizes the power delivered to the mobile station. A disadvantage of this method is the need for constant measurement and feedback of the channel characteristics and the subsequent recalculation of the adaptive array weights used to modify signals for each antenna element. The time needed to measure and compute the weights limits the speed at which the antenna pattern may be modified to compensate for a changing channel. When a mobile station travels at a higher speed, the channel changes at a rate that is higher than the rate of compensation in the adaptive antenna array. Thus, the feedback loop in the adaptive array or beamforming technique cannot keep up with a quickly changing channel between the base station and a high-speed mobile station.

From the above, it becomes apparent that beamforming is desirable when the mobile station is moving into low speeds and orthogonal or space time transmit diversity (STTD) or variations thereof is desirable when the mobile station is moving at high speeds.

Therefore, it is apparent that there is a need for an improved method of transmitting and receiving a traffic channel using technique from both beamforming and orthogonal transmit diversity.

SUMMARY OF THE INVENTION

This invention relates to a closed loop duplex communications system having at least two antennae at the forward link transmitter. A feedback channel from the forward link receiver to the forward link transmitter carries feedback information about the phase and magnitude relationships of the forward link channels from different transmitter antennae. The feedback information is used to compute beamforming weights for the forward link. The signals received on the at least two antennae of the reverse link are used to compute code correlation parameters for application on the forward link.

BRIEF DESCRIPTION OF THE DRAWINGS

The features, aspects and advantages of the present invention will become better understood with regard to the following description, appended claims, and accompanying drawings where:

DETAILED DESCRIPTION OF THE PREFERRED EMBODIMENT

Figure 1:
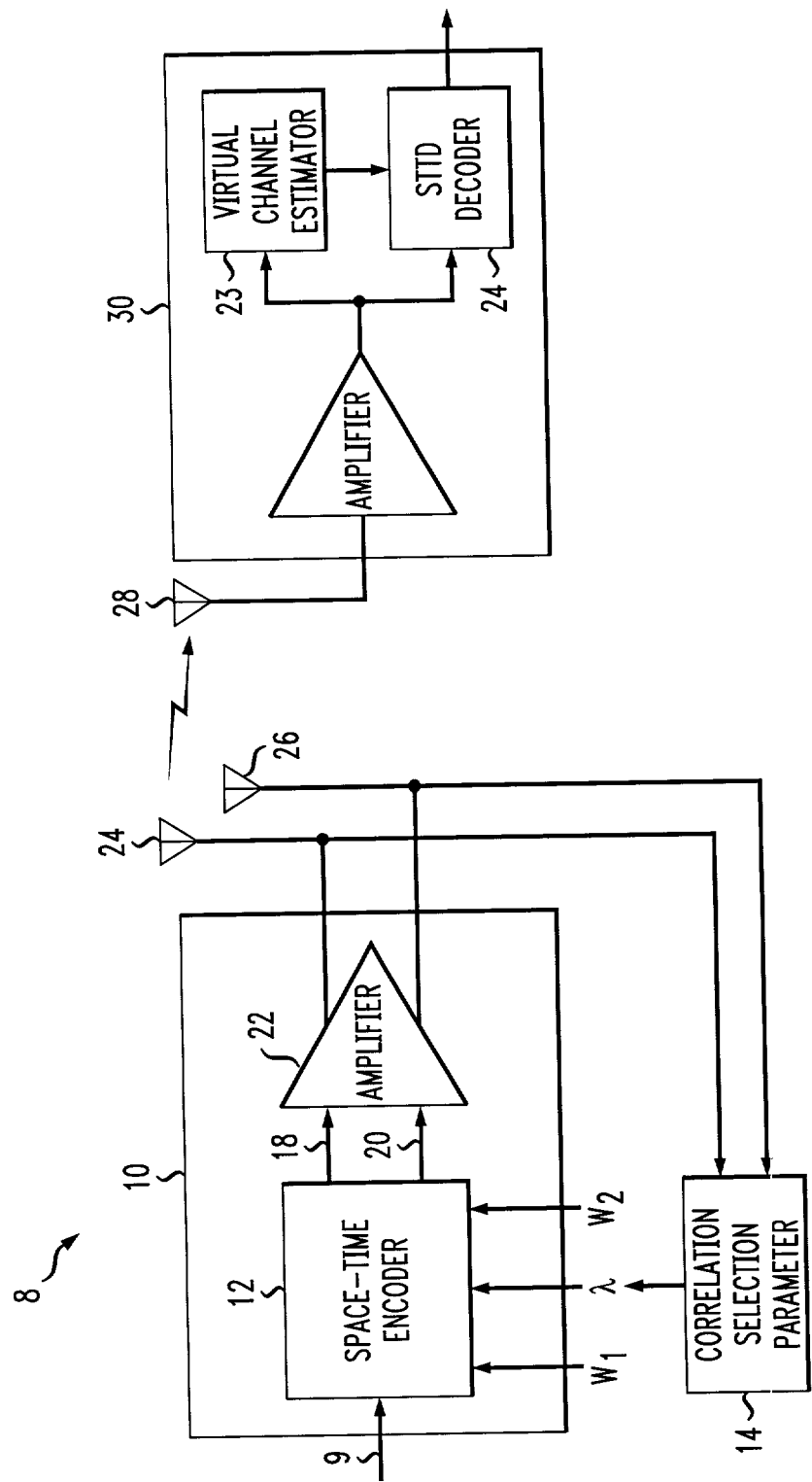
FIG. 1 is a block diagram of structure in accordance with the principles of the invention.

Beamforming and orthogonal space-time coding (such as space time transmit diversity (STTD) or a variant of STTD) are two methods being studied for transmission using multiple antennas due to the potentially significant diversity and/or array gains that can be obtained. With beamforming, the signals transmitted by the different antennas differ only by a complex scaling factor, designed such that the signals add constructively at the intended receiver. With orthogonal space-time coding, the signals transmitted by the different antennas are orthogonal, in order to allow their independent demodulation.

Beamforming and orthogonal coding are representative of two very different methods used for multiple antenna transmission. Beamforming relies completely on correct channel knowledge at the transmitter whereas orthogonal coding ignores any channel information the transmitter may have. In practice, the transmitter often has some instantaneous or average knowledge of the channel, in which case both these strategies are sub-optimal. A better transmission strategy as is here disclosed for the first time is to combine both orthogonal coding and beamforming in a proportion that is best suited for a particular transmission scenario.

The new method here disclosed, which is an alternative to using only beamforming or orthogonal coding, is to combine beamforming with orthogonal coding in a proportion that depends on the amount of correct channel knowledge at the transmitter. To achieve this desired result, there is here disclosed a family of space-time block codes, for transmitting with two or more transmit antennas, that generate variations of the correlation between the signals transmitted by the different transmit antennas. Disclosed here are methods to encode and decode the signals, and the method to choose the appropriate correlations between the signals.

Beamforming can be of two kinds: open-loop and closed-loop. In closed loop, which is also called closed-loop transmit diversity or maximal ratio transmission, there is a feedback channel from the receiver to the transmitter that provides instantaneous channel information to the multiple antenna transmitter. The channel information available to the transmitter may be corrupted due to channel estimation error, quantization errors, feedback errors and feedback delay (doppler). Use of pure beamforming in closed-loop systems (as is the usual practice) when channel information is not accurate can severely degrade performance. Such degradation is seen, for instance, in closed-loop systems at high mobile speeds. Pure orthogonal coding, which does not require channel knowledge at the transmitter, is never used in closed loop since that would waste available channel information.

In open loop, there is no feedback from the receiver to the transmitter. Pure beamforming can be used with the help of spatial information gathered from the reverse link in a duplex system (e.g., for beamforming, angle of arrival measurement or channel correlation measurement from the reverse link is used). If the channels from all the transmit antennas are not well-correlated, beamforming provides little gain over orthogonal coding. For low channel correlations, orthogonal coding can even outperform open-loop beamforming.

Both beamforming and orthogonal coding are instances of the general technique of space-time coding. In each of the above cases, it is clear that a space-time code that combines beamforming and orthogonal coding in an appropriate proportion will outperform each. To achieve this, there is here disclosed a new space-time block code that allows variation of the signal correlation matrix, which is comprised of the correlations between the signals transmitted by the different antennas. If the correlation between the signals transmitted from different antennas is chosen to be zero, it corresponds to orthogonal coding. If the magnitude of the normalized correlation between the signals is chosen to be 1, then it corresponds to pure beamforming. This allows the transmission to gracefully transition between beamforming and orthogonal coding by varying the desired correlation matrix, based on the amount of reliable channel knowledge the transmitter has at any time. Embodiments of the encoder and decoder here disclosed are modifications of an STTD encoder and decoder, respectively.

In the reference "Combining transmit beamforming and orthogonal space-time coding by utilizing side information," by G. Jongren et al., in IEEE Sensor Array and Multichannel Signal Processing Workshop, pp. 153-157, 2000, there is proposed a scheme to combine beamforming and orthogonal space-time block codes using a different approach than that disclosed in this invention. Among differences to the scheme we propose here, their code is parameterized by a complex matrix that minimizes pair-wise error probability of the code, and is computed using computationally intensive convex optimization via interior point methods. In contrast, the block coding scheme disclosed here is parameterized by one or more correlation parameters that are determined using a look-up table from simple measurements made on the channel, as described in the description that follows. Also, their method requires the complex matrix to be made known to the receiver, which is not required by the scheme proposed here.

The description below is applied to a wireless digital communications system wherein the transmitter transmits a sequence of complex-valued information symbols via N transmit antennas. The information symbols represent voice, data or any other form of information that is required to be communicated to the wireless receiver. The signals transmitted from the N antennas are transformed by transmission channels that exist between the transmit antennas and the receiver. The transmission strategy of this invention is to encode the stream of information symbols to be transmitted into N streams of encoded symbols that are transmitted by the respective antenna elements. Such encoding is generally known as space-time coding, and the present invention specifies a particular encoding and decoding method that enables effective communication to take place when the transmitter has imperfect knowledge of the transmission channel.

Referring to FIG. 1, there is illustrated a wireless communication system 8 which can be used to implement an embodiment of the method of the invention having two transmit antennas (N=2). The wireless communication system 8 includes base transmitter 10 which transmits signals via antennas 15, 18 to subscriber unit 20. It is to be noted that, in FIG. 1, only the forward link of the communications system is shown where the system may also include a reverse link when there is duplex operation. A reverse link may also be required to provide a feedback loop for data and commands for operating the forward link in an adaptive array mode.

Figure 2:
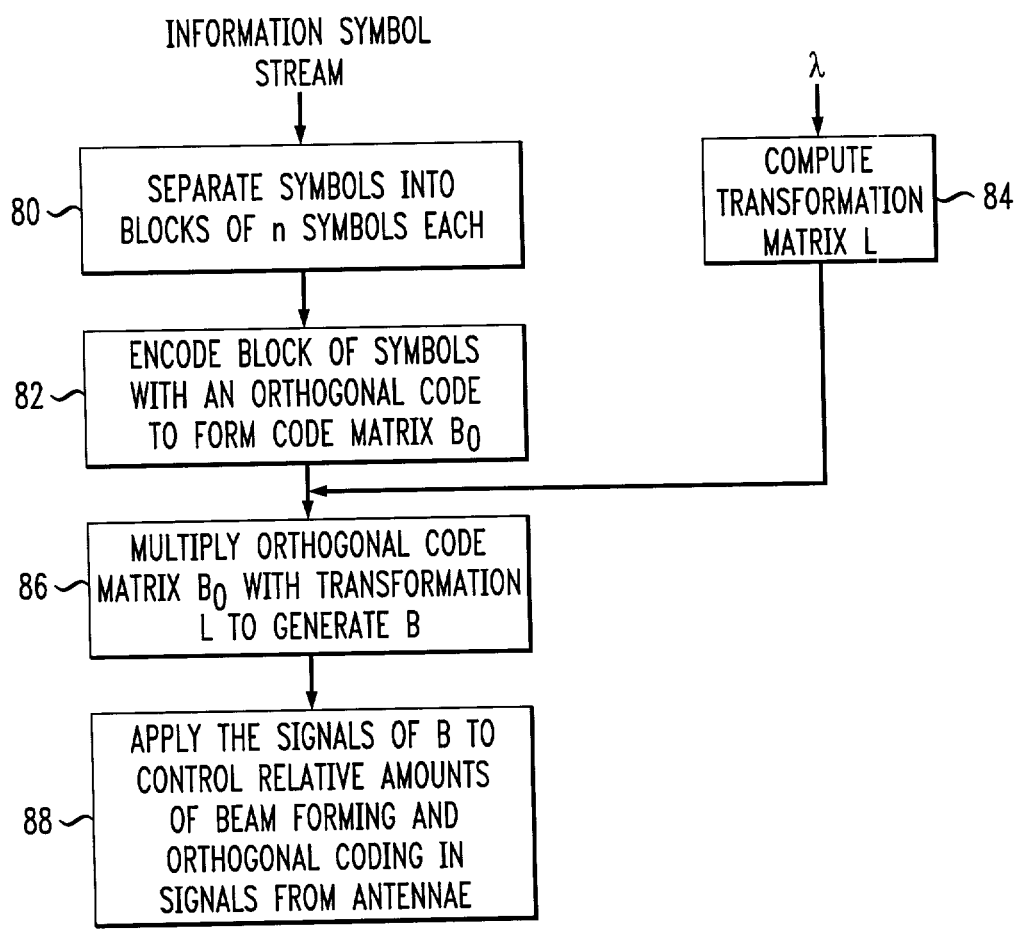
FIG. 2 is a flowchart illustrating the process of producing antenna element signals in accordance with the principles of the invention.

Referring to FIG. 2, in step 80, the separate symbols of the stream of serial data on input line 9 is formed into blocks of n symbols at the front end of space-time encoder 12. Thereafter, each block of symbols is encoded with an orthogonal code to form code matrix $B_0$ in step 82 (see relationship (9)). In step 84, the correlation parameter $\lambda$ is used to compute the transformation matrix L. It is to be noted that a single correlation parameter $\lambda$ will normally be used when there are more than two antennas. In step 86 the orthogonal code matrix $B_0$ is multiplied with the transformation L to obtain B. L is any matrix which satisfies the relationship $$\Phi = L^H \cdot L.$$

Stated in words, $\Phi$ is the desired correlation matrix and is equal to the conjugate transpace of L multiplied by L. In step 88, the signals of B are applied to different antennas in space and time.

The base transmitter 10 includes traffic channel 9 which is typically a serial data stream source of user data grouped into blocks of symbols each containing two symbols such as, for example, voice signals or data signals such as facsimile data, documents, software and the like.

The traffic channel 8 is coupled to space-time encoder 12. The space-time encoder is coupled to receive complex-valued weights $W_1, W_2, \ldots W_N$, which are shown in FIG. 1 for N=2 as $W_1$ and $W_2$. The beamformer weights are normalized to satisfy the equation $$|W_1|^2 + |W_2|^2 + \ldots + |W_N|^2 = 1. \quad (1)$$

One or more correlation parameters are fed to the space-time encoder 12. In the embodiment with two transmit antennas (N=2), depicted in FIG. 1, there is a single correlation parameter ($\lambda$) that is fed to the space-time encoder 12. The space-time encoder modifies and converts the traffic channel 9 into N parallel traffic channels which are amplified by 22 and transmitted by the N transmit antennas. FIG. 1 shows the two output channels of the encoder, 18 and 20, when N=2.

The operation of the space-time encoder 12 is now described. The encoder first encodes a block of M symbols to generate an orthogonal code matrix $B_0$ whose column vectors are orthogonal to each other. A transformation matrix L is also generated where L is any solution of the equation $L^H L = \Phi$, where $\Phi$ is the desired correlation matrix of the multiple antenna signals with N rows and N columns. Stated differently, the transformation matrix L is a matrix such that, when the conjugate transpose of L is multiplied by L generates a desired correlation matrix $\Phi$. The element in the ith row and jth column of the correlation matrix $\Phi$ is the desired correlation of the signal transmitted by the ith antenna with the signal transmitted by the jth antenna. Multiplication of the matrix $B_0$ with the transformation matrix L generates the code matrix $B = B_0 L$ whose columns are the signals transmitted by the different antennas. The element in the ith row and jth column of the matrix B is the signal transmitted by the ith antenna in the jth time interval.

This procedure is better explained by describing the embodiment shown in FIG. 1 for N=2 transmit antennas. In this embodiment, the block length M is also equal to 2, and the orthogonal code $B_0$ is given by the well-known STTD code, which is an equivalent variation of the Alamouti code. The block of M=2 information symbols are denoted by $s_1$ and $s_2$, and the STTD code is given by the matrix $$B_0 = \begin{bmatrix} s_1 & -s_2^* \\ s_2 & s_1^* \end{bmatrix} \quad (2)$$

The signal correlation matrix $\Phi$ is defined in terms of the correlation parameter $\lambda$ and beamformer weights $W_1$ and $W_2$ as $$\Phi = \begin{bmatrix} (1+\lambda)|w_1|^2 + (1-\lambda)|w_2|^2 & 2\lambda w_1^* w_2 \\ 2\lambda w_1 w_2^* & (1+\lambda)|w_1|^2 + (1=\lambda)|w_2|^2 \end{bmatrix}. \quad (3)$$

The final code matrix is designed as $$B = B_0 L, \quad (4)$$

where L is the transformation matrix, which is any of the several possible solutions to the equation $L^H L = \Phi$. Any of these solutions can be used in designing the transformation matrix L. One such solution is given by $$L = \begin{bmatrix} \sqrt{1+\lambda}\, w_1 & \sqrt{1+\lambda}\, w_2 \\ \sqrt{1-\lambda}\, w_2^* & -\sqrt{1-\lambda}\, w_1^* \end{bmatrix} \quad (5)$$

For this embodiment of the transformation matrix L, the space-time encoder 12 applies the signals to the two antennas in the two time intervals according to Table 1. The same encoding procedure is applied to the next block of two symbols, and so forth.

TABLE 1

|  | Time 1 | Time 2 |
| --- | --- | --- |
| Antenna 1 | $\sqrt{1+\lambda}\, w_1 s_1 - \sqrt{1-\lambda}\, w_2{}^* s_2{}^*$ | $\sqrt{1-\lambda}\, w_2{}^* s_1{}^* + \sqrt{1+\lambda}\, w_1 s_2$ |
| Antenna 2 | $\sqrt{1+\lambda}\, w_2 s_1 + \sqrt{1-\lambda}\, w_1{}^* s_2{}^*$ | $-\sqrt{1-\lambda}\, w_1{}^* s_1{}^* + \sqrt{1+\lambda}\, w_2 s_2$ |

A different solution of the equation $L^H L = \Phi$ yields a different formula for L and consequently a space-time code that is different from the embodiment described above. An example of such a code is when L is the matrix square root solution, which yields a matrix L such that $L^H = L$ and is given by $$L = \begin{bmatrix} \sqrt{1+\lambda}\, |w_1|^2 + \sqrt{1-\lambda}\, |w_2|^2 & \sqrt{1+\lambda} - \sqrt{1-\lambda}\, w_1^* w_2 \\ \sqrt{1+\lambda} - \sqrt{1-\lambda}\, w_1 w_2^* & \sqrt{1-\lambda}\, |w_1|^2 + \sqrt{1-\lambda}\, |w_2|^2 \end{bmatrix}. \quad (6)$$

This choice of L results in an encoder that applies the signals given in Table 2. These or any other solutions of $L^H L = \Phi$ can be used to design the encoder.

TABLE 2

|  | Time 1 | Time 2 |
| --- | --- | --- |
| Antenna 1 | $(\sqrt{1+\lambda}|w_1|^2 + \sqrt{1+\lambda}|w_2|^2)w_1 -$ $\sqrt{1+\lambda} - \sqrt{1-\lambda}\, w_1 w_2{}^* s_2{}^*$ | $(\sqrt{1+\lambda} - 1 - \lambda|w_2|^2)$ $w_1 w_2{}^* s_2{}^* +$ $(\sqrt{1+\lambda} - \sqrt{1-\lambda}|w_1|^2 +$ $\sqrt{1-\lambda}|w_2|^2)s_2$ |
| Antenna 2 | $(\sqrt{1+\lambda} - \sqrt{1-\lambda})w_1{}^* w_2 s_1 -$ $(\sqrt{1-\lambda}|w_1|w_1|^2 +$ $\sqrt{1+\lambda}|w_2|^2)s_2{}^*$ | $(\sqrt{1-\lambda}|w_1|^2 + \sqrt{1+\lambda}|w_2|^2)s_1{}^* +$ $(\sqrt{1+\lambda} - \sqrt{1-\lambda}\, w_1{}^* w_2 s_2$ |

The transmission scheme described above combines the strategies of beamforming and orthogonal coding. The code correlation parameter $\lambda$ is a parameter that can be used by the transmitter to control the relative amounts of beamforming and orthogonal coding that are applied. When $\lambda = 0$, then the above embodiment of the transmission scheme with n=2 is similar to orthogonal coding using a modified Alamouti code. (See "A simple transmitter diversity scheme for wireless communications," by S. Alamouti, IEEE Journal on Selected Areas in Communications, pp. 1451-1458, October 1998; and "Transmitter diversity technique for wireless communications," U.S. Pat. No. 6,185,258B1, by S. Alamouti and Tarokh. When $\lambda=1$, then the transmission scheme is similar to beamforming. Smaller values of the code correlation parameter $\lambda$ means that the transmission scheme includes both beamforming and orthogonal coding but is weighted toward orthogonal coding, and larger values of $\lambda$ means that the transmission scheme includes both beamforming and orthogonal coding but is weighted toward beamforming. A large value of $\lambda$ should be chosen when the confidence is high at the transmitter on the correctness of the beamformer weights ($W_1$ and $W_2$ in the embodiment described above). The beamformer weights in turn depend on the knowledge that the transmitter has about the channel. A small value of $\lambda$ should be chosen when there is little confidence at the transmitter about the correctness of the beamformer weights. For instance, in a closed loop transmit diversity system in mobile communications, $\lambda$ could be made to be close to 1 when the mobile speed is low and there is reliable feedback of beamforming weights from the mobile receiver to the transmitter. At high mobile speeds when the feedback information is not reliable, $\lambda$ can be made to be close to 0 so that orthogonal coding is implemented, which does not rely on feedback information. The code correlation parameter can be optimally selected for any given communications scenario. An example of optimal design of $\lambda$ is to minimize the probability of symbol or bit error at the receiver subject to a constraint on the transmit power. Another possible method of selecting an optimal $\lambda$ is to minimize the transmit power subject to a constraint on the probability of error at the receiver.

In closed-loop with two transmit antennas, an embodiment of the correlation parameter selector 14 is as follows. The reverse link channel measurements are used to compute the auto-correlation of the channel estimates on the reverse link, for a time lag equal to the round-trip delay. In other words, the correlation $\rho$ of the reverse link channel estimate at the present time with that at a time $\tau$ seconds earlier is computed. The time $\tau$ is equal to the delay between the time the receiver computes closed loop feedback information and the time the corresponding weights are applied by the multiple antenna transmitter. This delay $\tau$ can also be adjusted to account for the difference (if any) in carrier frequencies on the forward and reverse links, by multiplying the round-trip delay by the ratio of reverse link and forward link carrier frequencies. As was the case in the embodiment of 14 for an open loop system, the magnitude of $\rho$ is used in a look-up table stored at the transmitter to select the optimal value of $\lambda$.

The encoded symbols are transmitted over the transmit antennas after multiplication with spreading code (if any) and frequency up-shifting by a carrier signal in 22. Assuming frequency non-selective fading channels between the transmit 24, 26 and receive 28 antennas, the signal received from a particular transmitter antenna is the signal transmitted by the antenna multiplied by a complex channel gain. For example, where N=2, the channel gains from the first and second transmitter antennas are denoted as $h_1$ and $h_2$, respectively. The block of encoded symbols at times 1 and 2, as described above, are received, after despreading as baseband signal vector r, where $$r = \begin{bmatrix} r_1 \\ r_2 \end{bmatrix} = B_0 Lh + n. \tag{7}$$

In the above relationship, $h=[h_1\ h_2]^T$ and is the channel gain vector (which includes transmitted signal amplitude), $n=[n_1\ n_2]^T$ and is the noise vector, and $B_0$ is the orthogonal code matrix described above.

Equation (7) for the received signal can be rearranged and written as $$r = B_0 h_\lambda + n, \tag{8}$$

where $h_\lambda$ is the "virtual" channel gain vector that is given by the relationship $$h_\lambda = \begin{bmatrix} h_{\lambda 1} \\ h_{\lambda 2} \end{bmatrix} = Lh, \tag{9}$$

where L is the transformation matrix applied at the transmitter, as described above. It is clear from the above model for the received signal that, to the receiver, the received signal appears to be coming from a multiple antenna transmitter that transmits orthogonal signals using the orthogonal $h_\lambda$. Therefore, the receiver that is used to demodulate signals transmitted using the orthogonal code $B_0$ can also be used to demodulate the signals transmitted using the proposed space time code, by replacing the true channel estimates with estimates of the virtual channel. Since the embodiment shown in FIG. 1 uses the STTD orthogonal code, the receiver 30 is comprised of the STTD decoder 24 in conjunction with a virtual channel estimator 23 which computes estimates of the virtual channel $h_\lambda$ from the received signal.

In one embodiment of the virtual channel estimator 23, the dedicated pilot symbols, which are symbols known at the receiver that are embedded into the transmitted information symbols and are also encoded using the same code, are used. If the dedicated pilot symbols are encoded this way, the well-known method of estimating the channel using a pilot for the STTD code directly yields the required estimate of the virtual channel vector.

Another embodiment of 23 to estimate the virtual channel is to estimate the true channel h using any of the methods commonly used for channel estimation, and estimate the code parameter $\lambda$, and use these two estimates to compute an estimate of the virtual channel by using the relation $h_\lambda=Lh$. In this embodiment, the true channel estimation can be reliably performed using the common pilot symbols that are not encoded with the proposed code. The value of $\lambda$ could either be explicitly signalled to the receiver by the transmitter via the forward data link, or can be estimated at the receiver. Estimation of $\lambda$ at the receiver can be performed using the same look-up table method used in the correlation parameter selector 14, along with estimation of the channel correlations at the receiver, both in open and closed loop. The computation of $\lambda$ in this embodiment is therefore performed in a manner identical to the selection of $\lambda$ at the transmitter by 14, except that no adjustment of time delay needs to be made at the receiver in closed loop.

The proposed transmission technique can also be used in conjunction with multiple antennas at the receiver, in a manner similar to the multiple antenna reception of orthogonal coded signals.

Having a control on the amount of beamforming and orthogonal coding is useful in the special case of scheduled transmission for high speed data. In scheduled transmissions, the transmitter transmits a burst of data at a high data rate during the times when it estimates that the channel gain is large. It is beneficial in this case to perform more beamforming than orthogonal coding. Therefore, one method to improve scheduled transmission is to select a larger value of λ during these bursts of high data rate transmission than the λ that would be chosen for non-scheduled transmission.

While various embodiments of the invention have been described, it should be apparent that variations and alternative embodiments can be implemented in accordance with the invention. It is to be understood, therefore, that the invention is not to be in any way limited except in accordance with the spirit of the appended claims and their equivalents.

The invention claimed is:

1. A method of generating signals for transmitting from at least two antennae of a wireless communications system comprising the steps of:
   determining a channel correlation coefficient (ρ) from signals received on a reverse link, wherein the channel correlation coefficient is an estimate of an auto-correlation coefficient of channel gain from an antenna evaluated at a specified time delay;
   using the channel correlation coefficient (ρ) to select a code correlation parameter (λ) wherein the code correlation parameter (λ) determines the correlation of the encoded signals to said at least two antennae;
   feeding a signal representative of a beamforming weight parameter to an encoder to modify a stream of information symbols;
   feeding the code correlation parameter (λ) to the encoder to control the proportion of orthogonal coding relative to beamforming of the stream of information symbols that are to be transmitted; and
   feeding the stream of information symbols modified by the code correlation parameter to said at least two antennae for transmission.

2. The method of claim 1, wherein the signal representative of the beamforming weight parameter represents a complex number having a magnitude and a phase.

3. The method of claim 1, wherein the signal representative of the beamforming weight parameter is a real number portion of a phase of the beamforming weight parameter.

4. The method of claim 3 wherein the code correlation parameter is a real number that can vary between a first value and a second value.

5. The method of claim 4 wherein one of the values of the code correlation parameter represents orthogonal coding with no beamforming and the other value represents beamforming with no orthogonal coding, and intermediate values represent a combination of orthogonal coding and beamforming.

6. The method of claim 1, wherein the channel correlation coefficient (ρ) is a complex number from which the magnitude component and not the phase component is used to determine the code correlation parameter λ.

7. The method of claim 1 wherein the specified time delay is determined by the difference between the time at which feedback information is transmitted on the reverse link to the time at which the beamforming weight parameter computed using that information is applied by a forward link transmitter.

8. The method of claim 7 wherein the specified time delay is equal to the time difference multiplied by the ratio of carrier frequencies on the reverse and forward links.

9. The method of claim 1, wherein the signal transmitted by each antenna at each symbol time is the sum of one or more signals, each of which is proportional to the product of one of the incoming information symbols and their complex conjugates and their negations and their negations of their complex conjugates, with a number that is determined by the code correlation parameter (λ).

10. The method of claim 1, wherein determining the channel correlation coefficient from the signals received on the reverse link comprises determining the channel correlation coefficient by correlating the signals for the specified time delay that is equal to a round-trip delay.

11. The method of claim 10, wherein correlating the signals for the specified time delay comprises correlating the signals for a time delay equal to a delay between a time a receiver computes closed loop feedback information and a time corresponding weights are applied by a transmitter.

12. The method of claim 11, comprising adjusting the specified time delay to account for a difference in at least one carrier frequency on the forward link or the reverse link.

13. The method of claim 1, wherein the code correlation parameter is determined by the channel correlation coefficient at the specified time delay.

14. A method of forming a signal comprising the steps of:
   obtaining at least two component signals;
   determining first and second complex numbers based upon an autocorrelation of a channel estimate;
   multiplying a first component signal by the first complex number to obtain a first signal;
   multiplying a second component signal by the second complex number to obtain a second signal, wherein the phases of the first and second complex numbers are unequal; and
   subtracting the second signal from the first signal to obtain a first composite signal for transmission by a first antenna element during a first transmit period.

15. A method of forming signals for transmission from an antenna element during two transmit periods comprising the steps of:
   obtaining at least two component signals for each transmit period;
   multiplying a first component signal by a first complex number to obtain a first signal;
   multiplying a second component signal by a second complex number to obtain a second signal, wherein the phases of the first and second complex numbers are unequal;
   subtracting the second signal from the first signal to obtain a first composite signal for transmission by the first antenna element during a first transmit period;
   multiplying a third component signal by the second complex number to obtain a third signal;
   multiplying a fourth component signal by the first complex number to obtain a fourth signal; and
   adding the third signal to the fourth signal to obtain a second composite signal for transmission by the antenna element during a second transmit period.

16. A method of forming signals for transmission from two antenna elements during two transmit periods comprising the steps of:
   obtaining at least two component signals for each antenna for each time interval;
   multiplying a first component signal by a first complex number to obtain a first signal;
   multiplying a second component signal by a second complex number to obtain a second signal, wherein the phases of the first and second complex numbers are unequal;
   subtracting the second signal from the first signal to obtain a first composite signal for transmission by a first antenna element during a first transmit period;
   multiplying a third component signal by the second complex number to obtain a third signal;

multiplying a fourth component signal by the first complex number to obtain a fourth signal;

adding the third signal to the fourth signal to obtain a second composite signal for transmission by the first antenna element during a second transmit period;

multiplying the first component signal by a third complex number to obtain a fifth signal;

multiplying the second component signal by a fourth complex number to obtain a sixth signal, wherein the phases of the third and fourth complex numbers are unequal;

adding the fifth signal to the sixth signal to obtain a third composite signal for transmission by the second antenna element during the first transmit period;

multiplying the third component signal by the fourth complex number to obtain a seventh signal;

multiplying the fourth component signal by the third complex number to obtain an 8th signal; and subtracting the seventh signal from the 8th signal to obtain a fourth composite signal for transmission by the second antenna element during the second transmit period.

17. The method of claim 16 wherein the component signals are determined by at least one incoming information symbol and at least one of the component signals is related to a code correlation parameter.

18. The method of claim 17 wherein each component signal is related to at least one of two information symbols, or their negations, or their complex conjugates or the negations of their complex conjugates.

19. A method of forming a signal comprising the steps of:
obtaining at least two component signals;
determining first and second phases based upon an autocorrelation of a channel estimate;
applying the first phase to a first component signal to obtain a first signal;
applying the second phase to a second component signal to obtain a second signal, wherein the first and second phases are unequal; and
combining the second signal and the first signal to obtain a first composite signal for transmission by a first antenna element during a first transmit period.

20. A method of forming signals for transmission from an antenna element during two transmit periods comprising the steps of:
obtaining at least two component signals for each transmit period;
applying a first phase to a first component signal to obtain a first signal;
applying a second phase to a second component signal to obtain a second signal, wherein the first and second phases are unequal;
combining the second signal and the first signal to obtain a first composite signal for transmission by the first antenna element during a first transmit period;
applying the second phase to a third component signal to obtain a third signal;
applying the first phase to a fourth component signal to obtain a fourth signal; and
combining the third signal and the fourth signal to obtain a second composite signal for transmission by the antenna element during a second transmit period.

21. A method of forming signals for transmission from two antenna elements during two time intervals comprising the steps of:
obtaining at least two component signals for each antenna for each time interval;
applying a first phase to a first component signal to obtain a first signal;
applying a second phase to a second component signal to obtain a second signal, wherein the first and second phases are unequal;
combining the second signal and the first signal to obtain a first composite signal-for transmission by a first antenna element during a first time interval;
applying the second phase to a third component signal to obtain a third signal;
applying the first phase to a fourth component signal to obtain a fourth signal;
combining the third signal and the fourth signal to obtain a second composite signal for transmission by the first antenna element during a second time interval;
applying a third phase to the first component signal to obtain a fifth signal;
applying a fourth phase to the second component signal to obtain a sixth signal, wherein third and fourth phases are unequal;
combining the fifth and sixth signals to obtain a third composite signal for transmission by the second antenna element during the first transmit period;
applying the fourth phase to the third component signal to obtain a seventh signal;
applying the third phase to the fourth component signal to obtain an 8th signal; and
combining the fifth signal and the sixth signal to obtain a fourth composite signal for transmission by the second antenna element during the second time interval.

* * * * *